United States Patent
Ketcham et al.

(10) Patent No.: US 6,179,341 B1
(45) Date of Patent: Jan. 30, 2001

(54) QUICK CONNECT RETAINER HAVING TOLERANCE FOR WIDE BAND OF MALE TUBE DIMENSIONS

(75) Inventors: Mark G. Ketcham, East China; Stephen H. Gunderson, Marine City, both of MI (US)

(73) Assignee: Bundy Corporation, Warren, MI (US)

( * ) Notice: Under 35 U.S.C. 154(b), the term of this patent shall be extended for 0 days.

(21) Appl. No.: 08/673,574

(22) Filed: Jul. 1, 1996

(51) Int. Cl.[7] .................................................... F16L 55/00
(52) U.S. Cl. ...................................... 285/148.23; 285/319
(58) Field of Search .................................. 285/319, 177, 285/233, 148.23

(56) References Cited

U.S. PATENT DOCUMENTS

| | | | |
|---|---|---|---|
| 4,150,847 | * | 4/1979 | De Cenzo ........................ 285/233 X |
| 4,749,214 | * | 6/1988 | Hoskins ............................ 285/319 X |
| 4,834,423 | * | 5/1989 | DeLand ............................ 285/319 X |
| 5,131,691 | * | 7/1992 | Washizu ............................... 285/319 |
| 5,542,717 | * | 8/1996 | Rea et al. ............................. 285/319 |

* cited by examiner

Primary Examiner—Dave W. Arola
(74) Attorney, Agent, or Firm—McEachran, Jambor, Keating, Bock & Kurtz

(57) ABSTRACT

A quick connector coupling comprises a hollow connector body and a male tube received and secured in the connector body. The male tube has a radially enlarged upset. A retainer is disposed in the connector body and has an inner base ring through which the male tube extends. The retainer also has compressive members which abut a shoulder formed in the connector body to secure the retainer in the connector body. The compressive members extend towards the base ring and terminate before reaching the base ring to define a space between the compressive members and the base ring. The upset is captured in this space thereby securing the male tube in the connector body. A chamfer is formed in the base ring to provide tolerance for a wider band of male tube dimensions.

4 Claims, 2 Drawing Sheets

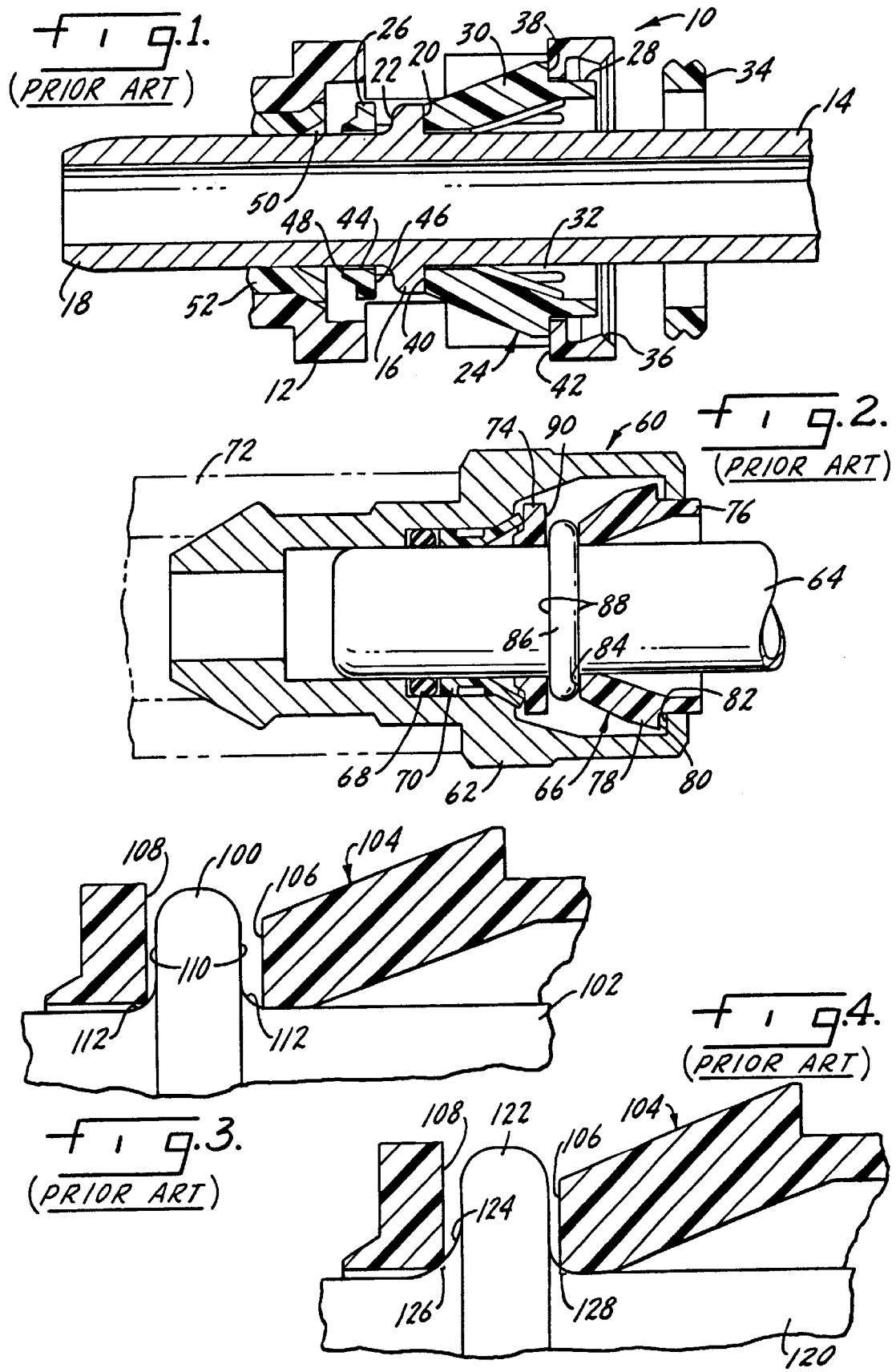

QUICK CONNECT RETAINER HAVING TOLERANCE FOR WIDE BAND OF MALE TUBE DIMENSIONS

BACKGROUND OF THE INVENTION

This invention relates to fluid line systems which include quick connector couplings, and more particularly to a retainer for a quick connector coupling having tolerance for a wide band of male tube dimensions.

In automotive and other fields, quick connector couplings, which generally include a male tube received and sealingly retained in a female connector body, are often utilized to provide a fluid connection between two components or conduits, thus establishing a fluid line between the two components. Use of quick connector couplings is advantageous in that a sealed and secured fluid line connection may be established quickly and easily.

A number of methods and mechanisms exist for securing the male tube and female connector body of a quick connector coupling together. One retention mechanism, which is the subject of the present invention, involves use of a plastic retainer disposed within the connector body.

The retainer has a base ring disposed inside of the connector body which is connected to outer portions aligned with, and positioned inside of, the connector body entrance. Compressive members extend from the outer portions to positions spaced from the base ring. The outer ends of the compressive members abut a radial shoulder formed within the connector body to secure the retainer inside of the connector body, and an enlarged upset formed on the inserted male tube is captured in the space between the compressive members and base ring to secure the tube in the connector body.

Conventional retainer designs can tolerate only a narrow band of male tube dimensions. Introduction of new materials, suppliers and manufacturing methods, however, have led to use of male tubes having a broad and varying band of dimensions. Conventional retainers are often not able to accommodate tubes of varying dimensions. Consequently, different sizes of retainers must often be utilized for tubes having just minor differences in dimension. Significant expense results, since a new mold must be constructed for each retainer variation. Management, tracking and identification of multiple retainer variations for multiple customers also adds to complexity and expense.

The present invention addresses this problem by providing an improved retainer design which can tolerate a wider band of male tube dimensions.

SUMMARY OF THE INVENTION

A quick connector coupling according to the present invention comprises a hollow connector body and a male tube received and secured in the connector body. The male tube has a radially enlarged upset. A retainer is disposed in the connector body and has an inner base ring through which the male member extends. The retainer also has compressive members which abut a shoulder formed in the connector body to secure the retainer in the connector body. The compressive members extend towards the base ring and terminate before reaching the base ring to define a space between the compressive members and the base ring. The upset is captured in this space thereby securing the male tube in the connector body. The base ring is chamfered, and the inner diameter of the compressive members enlarged, to provide tolerance for a wider band of male tube dimensions.

BRIEF DESCRIPTION OF THE DRAWINGS

FIG. 1 is a sectional view of a prior art quick connector coupling;

FIG. 2 is a partial sectional view of another prior art quick connector coupling;

FIG. 3 is an enlarged partial sectional view of a male tube captured by a retainer;

FIG. 4 is an enlarged partial sectional view of another male tube captured by a retainer;

DETAILED DESCRIPTION OF PREFERRED EMBODIMENTS

Figure 5:
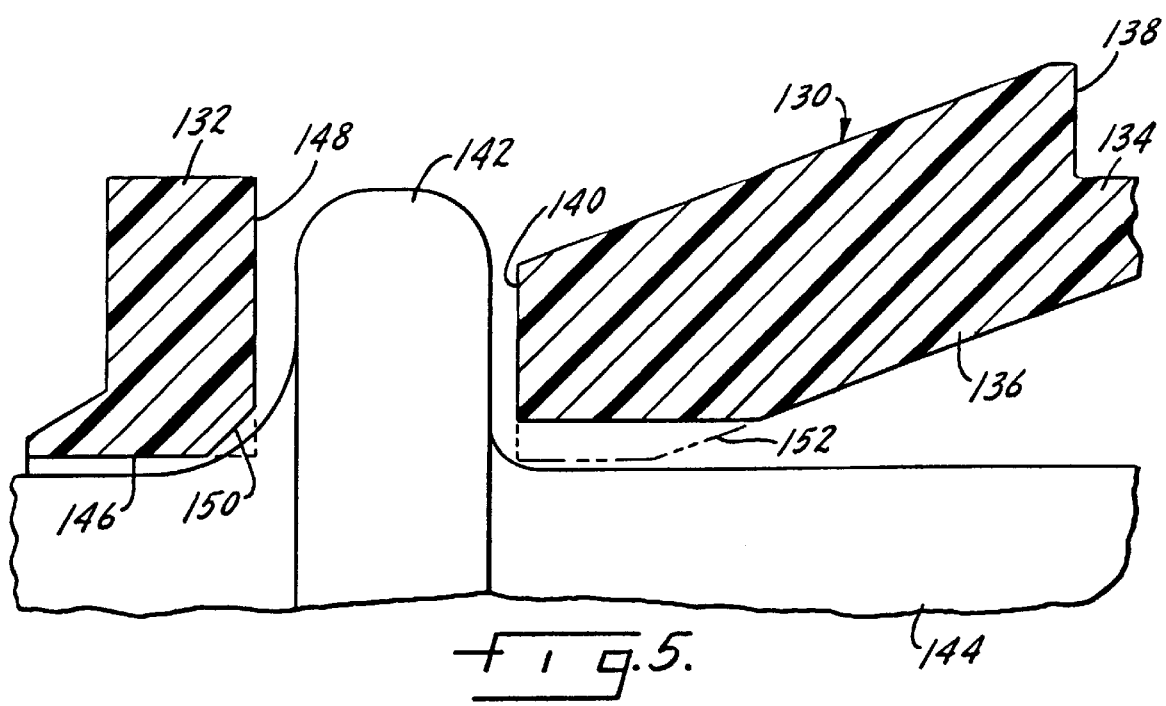
FIG. 5 is an enlarged partial sectional view of a male tube captured by a retainer according to the present invention.

A prior art quick connector coupling 10 is illustrated in FIG. 1. Coupling 10 is comprised of a generally cylindrical female connector body 12 and a male tube 14. Connector body 12, in use, is connected to flexible hose or another system component. Likewise, male tube 14 forms a part of a fluid line system. Connector body 12 and tube 14 are connectable to form a permanent, but severable, joint in the fluid line.

Tube 14 includes a radially enlarged upset 16 formed a given distance from tube end 18. Upset 16 defines an abutment wall 20 formed perpendicular to the outside surface of tube 14 facing away from tube end 18, and a sloped wall 22 facing tube end 18.

A plastic retainer 24 is disposed within connector body 12. Retainer 24 is comprised of base ring 26, outer portions 28 and compressive members 30 extending from outer portions 28 toward base ring 26. Connecting leg portions 32 join base ring 26 and outer portions 28. The coupling illustrated in FIG. 1 also includes an indicator member 34 receivable in an indicator pocket 36. The indicator features are not part of the present invention but are explained in detail in U.S. Pat. No. 5,499,848.

Compressive members 30 each include at one end, a first locking surface 38 facing away from base ring 26, and at an opposite end, a second locking surface 40 facing base ring 26. First locking surfaces 38 abut a shoulder 42 formed in connector body 12 to secure retainer 24 inside of connector body 12, and second locking surfaces 40 abut abutment wall 20 of upset 16 to capture upset 16 in the space between compressive members 30 and base ring 26, and thereby secure male tube 14 in connector body 12. Compressive members 30 may be spread apart to permit insertion of tube 14 into connector body 12 to a secured position (illustrated), and conversely, to permit release of tube 14 (with use of an appropriate release tool).

Base ring 26 includes a central opening, defined by cylindrical wall 44, through which tube 14 passes and fits closely. A limit surface 46 is perpendicular to cylindrical wall 44 and, together with locking surfaces 40 of compressive members 30, defines the space within which upset 16 is captured. As is evident in FIG. 1, contact between sloped surface 22 of upset 16 and limit surface 46 of base ring 26 limits movement of upset 16 within this space. Conical flange 48 is formed on base ring 26 opposite limit surface 46. If retainer 24 and tube 14 are pressed further into connector body 12, conical flange 48 fits into conical cavity 50 of spacer 52 which is press-fit into connector body 12.

FIG. 2 illustrates a similar prior art coupling 60. Coupling 60 includes a connector body 62, a male tube 64 and a retainer 66. An O-ring seal 68 is held in connector body 62 by a spacer 70, and a hose 72 is received over the end of connector body 62. Retainer 66 is of the same type as the retainer shown in FIG. 1. It includes a base ring 74 and outer portions 76 joined to base ring 74 by connective leg portions (not shown) similar to leg portions 32 of FIG. 1. Compressive members 78 extend from outer portions 76 toward base ring 74. First locking surfaces 80 of compressive members 78 abut shoulder 82 to secure retainer 66 in connector body 62, and second locking surfaces 84 abut upset 86 formed on tube 64 to secure tube 64 in connector body 62.

Upset 86 differs from upset 16 of FIG. 1. It defines two abutment walls 88, each of which is substantially perpendicular to the outer surface of tube 64. Moreover, upset 86 is in an extremely tight fit in the space between compressive member locking surfaces 84 and perpendicular limit surface 90 of base ring 74. It has no range of movement within its captured space.

FIGS. 1 and 2 have been included and described herein because they are exemplary of retainer design and tolerance concerns relative to male tubes. Retainer 24 of FIG. 1 could accept a male tube having a slightly wider upset or with abutment walls of slightly different slope. Retainer 66 of FIG. 2, by contrast, is at its maximum tolerance. Upset 86 could not be widened, nor could any slope or radii be added to its abutment walls 88. FIGS. 1 and 2 also illustrate that male tube dimensions and configurations, particularly regarding the upsets, are not uniform. A tube having an upset of the same nominal width as upset 86 in FIG. 2, but having a sloped wall or radii similar to wall 22 of upset 16 in FIG. 1, would not fit properly within retainer 66 of FIG. 2. A retainer having a greater spacing between the base ring and compressive members would be required.

This problem is magnified in FIGS. 3 and 4. FIG. 3 depicts an upset 100 of a tube 102 captured by a retainer 104. The remaining details of the coupling, which correspond in function to the couplings of FIGS. 1 and 2, are not illustrated. Upset 100 is held in the space between compressive member locking wall 106 and base ring limit wall 108. Upset 100 includes abutment walls 110 which are substantially perpendicular to the outside surface of tube 102. Sloping wall portions 112 join walls 102 with the tube surface. Though the width of upset 100 is significantly less than the spacing between retainer walls 106 and 108, wall portions 112 cause contact between the upset and retainer base ring and compressive members, effectively pushing retainer 104 to the limit of its tolerance.

In FIG. 4, the retainer 104 of FIG. 3 is utilized, but a tube 120 having an upset 122 of different dimensions is introduced. Upset 122 is slightly wider than upset 100 of FIG. 3, and includes a more pronounced sloping wall portion 124. The result is that upset 122 does not fit properly in the space between retainer surfaces 106 and 108. Corner portions 126 and 128 of, respectively, the retainer base ring and compressive members, impinge on the upset. Hence, a slight change in the dimensions of the male tube has rendered retainer 104 ineffective.

Figure 6:
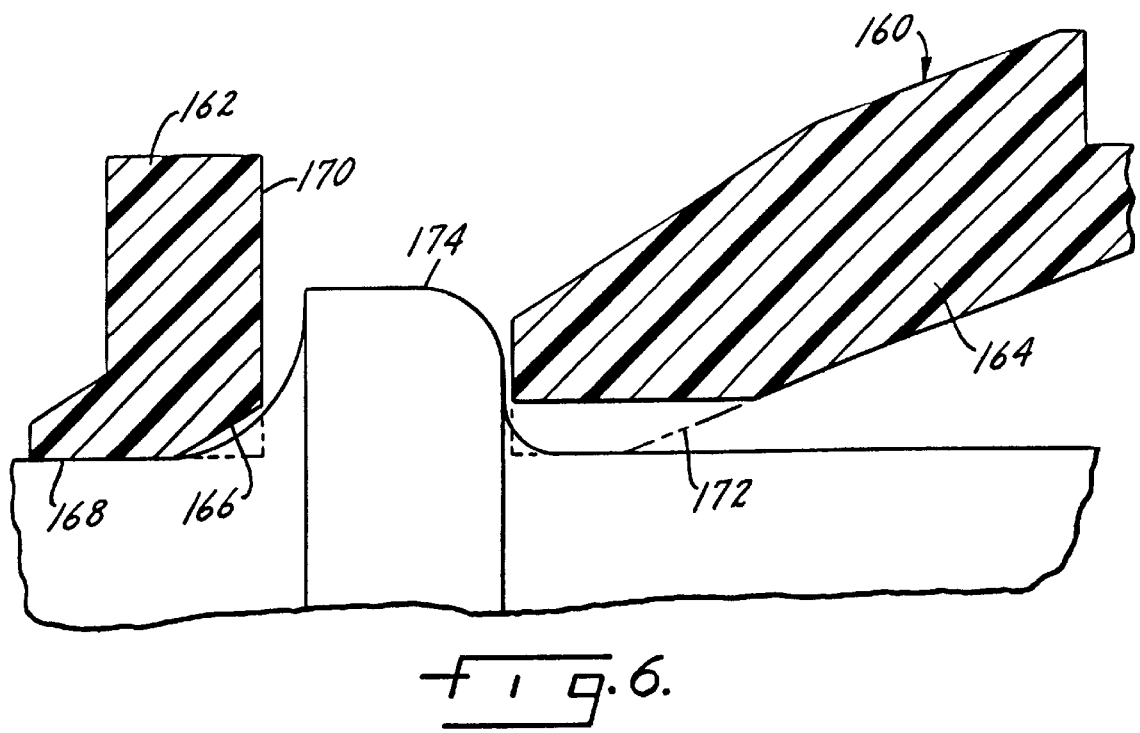
FIG. 6 is an enlarged partial sectional view of another male tube captured by a retainer according to the present invention.

The present invention, shown in FIGS. 5 and 6, provides a retainer design having tolerance for a wider band of tube dimensions. Retainer 130 of FIG. 5 is formed of injection molded plastic and has a base ring 132, outer portions 134 and compressive members 136 (one is shown). Outer portions 134 are connected to base ring 132 by connective leg portions (not shown) similar to leg portions 32 of the retainer of FIG. 1. First locking surface 138 of compressive member 136 abuts a shoulder of the connector body (not shown) to secure the retainer in the connector body. Second locking surface 140 facing base ring 132 abuts upset 142 formed on male tube 144. Base ring 132 has a central opening defined by cylindrical surface 146, and a limit surface 148 facing compressive members 136 and perpendicular to cylindrical surface 146.

Base ring 132 and compressive members 136 are modified to provide tolerance for an expanded band of male tube dimensions. A chamfer 150 is formed between limit surface 148 and cylindrical surface 146 to provide the ability to accommodate sloped surfaces on upsets. Chamfer 150 is formed during the injection molding process by enlarging the outer diameter of the mold core pin and providing the core pin with a conical tip. A base ring formed without a chamfer, as depicted in phantom lines, could not accommodate upset 142.

Inner diameter portions 152 of compressive members 136, shown in phantom lines, are also removed as a result of use of an enlarged diameter mold core pin. Enlarging the diameter of the mold core pin to provide a chamfer on the base ring had not been considered a viable option before the present invention because, as shown, it results in increased spacing between the compressive members. Contact between the compressive members and the external (non-upset portions) surface of the male tube is lost. Applicant has found that this loss of contact does not significantly reduce the strength of the retainer. Moreover, as seen particularly in FIG. 6, enlargement of the compressive member inner diameter provides further increased tolerance for male tubes of varying dimensions.

FIG. 6 depicts another embodiment of the present invention. Retainer 160 again includes a base ring 162 and compressive members 164. Chamfer 166 is formed between cylindrical wall 168 and perpendicular limit wall 170 during the injection molding process through use of an enlarged diameter core pin as described above. Chamfer 166 is formed at a reduced angle relative to wall 168, as compared to the embodiment of FIG. 5. Portions 172 of compressive members 164 are also removed through use of the core pin. As can be seen, the relatively exotic upset 174 would cause interference within retainer 160 without application of the principles of the present invention.

Various features of the present invention have been explained with reference to the embodiments shown and described. Of course, modification may be made to the described embodiments without departing from the spirit and scope of the invention as represented by the following claims.

What is claimed is:

1. A connector to receive a tube end having at least one radially enlarged upset comprising:

a hollow female connector body;

a retainer disposed in said connector body, said retainer having an annular inner base ring and defining a cylindrical surface to receive the tube end, and said retainer further defining compressive members;

said base ring having a limit surface facing said compressive members and a chamfer intersecting said limit surface and said cylindrical surface;

said compressive members defining an inner surface and a locking surface intersecting said inner surface, and further defining a space between said limit surface and said compressive members for securing the radially enlarged upset in said connector body;

wherein the diameter of the intersection of said locking surface with said inner surface of said compressive members being approximately as large as the diameter of the intersection of said chamfer with said limit surface.

2. A connector as claimed in claim 1 wherein said chamfer provides tolerance for a wide band of male tube dimensions.

3. a connector as claimed in claim 1 wherein said inner surface of said compressive members provides tolerance for a wide band of male tube dimensions.

4. A connector as claimed in claim 1 wherein said chamfer is adapted to accommodate a sloping wall portion of the upset.

* * * * *